United States Patent
Robinson, Jr.

(10) Patent No.: US 9,498,766 B2
(45) Date of Patent: *Nov. 22, 2016

(54) ZEOLITE COATED NASAL MASK AND DISPOSABLE PARTICULATE RESPIRATOR FILTRATION MEDIA

(71) Applicant: William L. Robinson, Jr., Baltimore, MD (US)

(72) Inventor: William L. Robinson, Jr., Baltimore, MD (US)

( * ) Notice: Subject to any disclaimer, the term of this patent is extended or adjusted under 35 U.S.C. 154(b) by 254 days.

This patent is subject to a terminal disclaimer.

(21) Appl. No.: 13/999,405

(22) Filed: Feb. 24, 2014

(65) Prior Publication Data

US 2015/0238784 A1 Aug. 27, 2015

(51) Int. Cl.
| | |
|---|---|
| *A41D 13/00* | (2006.01) |
| *B01J 20/06* | (2006.01) |
| *B01J 20/18* | (2006.01) |
| *A41D 13/11* | (2006.01) |
| *B01D 53/00* | (2006.01) |

(52) U.S. Cl.
CPC ............... *B01J 20/06* (2013.01); *A41D 13/11* (2013.01); *B01D 53/00* (2013.01); *B01J 20/18* (2013.01); *A41D 2400/32* (2013.01); *B01D 2253/108* (2013.01); *B01D 2257/106* (2013.01); *B01D 2257/404* (2013.01); *B01D 2257/93* (2013.01); *B01D 2259/4541* (2013.01)

(58) Field of Classification Search
CPC ....................................................... A41D 13/11
See application file for complete search history.

(56) References Cited

U.S. PATENT DOCUMENTS

| | | | | |
|---|---|---|---|---|
| 5,727,544 A | * | 3/1998 | Miura | A41D 13/11 128/201.13 |
| 6,281,515 B1 | * | 8/2001 | Demeo | G21F 3/02 250/516.1 |

FOREIGN PATENT DOCUMENTS

| | | |
|---|---|---|
| TW | B-326693 | 2/1998 |
| TW | B-469833 | 12/2001 |

\* cited by examiner

*Primary Examiner* — Francisco Tschen

(57) ABSTRACT

A method and use of Zeolite coated nasal mask and disposable particulate respirator filtration media that will absorb air pollutants such as NOx, Ozone, $PM_{2.5}$ and radioisotopes of cesium, strontium and polonium (the progeny of radon gas) and protect the wearer from inhalation of said deleterious agents.

4 Claims, No Drawings

ZEOLITE COATED NASAL MASK AND DISPOSABLE PARTICULATE RESPIRATOR FILTRATION MEDIA

BACKGROUND OF THE INVENTION

1. Field of the Invention

The present invention provides zeolite coated mechanical air filtration media and half faced disposable particulate respirator and nasal mask polypropylene filtration media, the latter having the function of air filtering and controlled removal of biological toxins from the body for health and therapeutic effects.

2. Discussion of the Related Art

The emission of exhausts from motorcycles, diesel powered automobiles, coal fired power plants (and in the case of Fukushima, Japan where ongoing radioactive fallout is occurring) have made air pollution an increasingly serious health problem, globally! NOx Ozone, Radon, VOCs, PAHs, PM2.5 and radioisotopes of Cesium and Strontium, and Polonium are among the main culprits and are a direct result of global industrialization. The question is how do you deal with interboundary air pollution? Although, inhalation of fibrous zeolites (large particle size, long, wide fibers not found in Clinoptilolite) have been implicated in pathogenesis of mesothelioma and lung fibrosis, SEM images show that Clinoptilolite (Zeolite) fibers are round in shape and in clinical tests with humans did not produce AM toxicity (pulmonary disease). Micronized Clinoptilolite have been shown to have anticancer and antioxidative effects. Traditional face masks cover both the nose and the mouth, making its wear inconvenient to the user. In addressing this problem, a prior art disclosed in Taiwan Patent No. 469833 relates to an insertion-type nasal filter which consists of a main body having two activated carbon pieces; said main body has a pair of large-diameter sleeve insert connected by a horizontal strip, and said pair of sleeve insert respectively has an entry hole. The main body of aforesaid nasal mask is made of soft material and may be fitted into nasal cavity of different sizes to closely engage the walls of nostril. The two activated carbon pieces are adhered to air inhalation hole to filter air passing through into the nasal passages.

Another prior art as illustrated in Taiwan Patent No. 326693 discloses a nasal insert with filtering effect comprising two nasal cannula and two activated carbon filters, wherein said nasal cannula has a unitarily connected netted base and a unitarily connected netted cap with a space retainer formed in between for placement of activated carbon filters. A flexible connecting piece is arranged between the two nasal cannula which can be secured on the bridge of nose. The cylindrical activated carbon filters are mounted in the space retainer with the netted cap closed before the cannulas are inserted into the nostril. The connecting member between the cannula is secured on the bridge of nose and the two cannula are secured inside the nostrils without slip-off.

The prior art could filter particulates in the air and activate the air, but the use of activated carbon filter only does not provide therapeutic or health effect, hence restricting the functions of the nasal mask.

The present invention provides a nasal mask and disposable particulate respirator filter media having the multiple functions of air filtering and by combining nanotechnologies as filter materials having bactericidal, bacteriostatic or controlled medication release effect on the filtration media, the nasal mask or disposable particulate respirators and can be worn for health or therapeutic purpose.

3. Statement of Need

There is a need for a way to trap, retain and recycle radioactive nuclear fission products (isotopes) e.g. $^{137}Cs$ and $^{90}Sr$ accidentally, intentionally or naturally released into the environment.

There is a need for a way to safely use Zeolites to trap air pollutants e.g. NOx, $H_2S$, VOCs, PAHs, Ozone and Radon Gas.

There is definitely a need for a way to effectively use Zeolites for time controlled release of biological therapeutic agents.

SUMMARY OF THE INVENTION

The object of the present invention is to provide coated AC air filtration media and, disposable particulate respiratory and nasal mask filtration media the latter when combined with antibacterial agents can achieve bactericidal and/or bacteriostatic effects.

Another object of the present invention is to provide a nasal mask having the function of controlled release of medication using zeolite coated microcapsules containing medication, that can be slowly released for direct absorption by nasal mucosa so as to achieve health or therapeutic effect.

The filtration material may be a disposable filter or unitarily formed filter.

Said filter material may have netted construction.

Said filter material may be woven or non-woven fabric material.

Said filter material may be non-woven fabric having microcapsules allowing controlled release of medication.

DETAILED DESCRIPTION OF THE INVENTION

The zeolite coated polypropylene filtration media can be a combined with bactericidal and/or bacteriostatic filter material in netted construction, which makes it a disposable filter designed separately from the main body of the nasal mask and can be replaced or repeatedly used. The main body of the nasal mask and connecting member are made of soft elastic material thermoplastic polyurethane (TPU). A filter material is first placed into the main body from the opening end before the nasal mask is placed into the nostrils of a user.

Another embodiment, the absorbent material for the filtration device therein is zeolite microcapsules having controlled release effect which allows slow timed release of bioactive material for direct absorption by nasal mucosa to achieve health and/or therapeutic effects when the mask is worn.

Yet, another embodiment of the nasal mask of the invention shows that the nasal mask filter media can be a bactericidal and/or bacteriostatic filter material of netted construction, which is disposable and can be designed to contain bioactive agents for direct absorption by nasal mucosa.

The preferred embodiments of the present invention have been disclosed in the aforementioned. However the aforementioned examples should not be construed as a limitation on the actual applicable scope of the invention, and as such, all modifications and alterations without departing from the spirits of the invention and appended claims shall remain within the protected scope and claims of the invention.

EXAMPLE

1. A Method of producing mechanical air filtration media and nasal mask and disposable particulate respirator filtration media containing absorbent materials such as Clinoptilolite or Phillipsite (Zeolite) as radiation, radioactive isotope and air pollution absorbing/trapping agents dissolved in de-ionized water along with a retention aid and a sealant polymer (Curie Formula) coated onto woven or nonwoven (polypropylene) fabric comprising: a) the step of mixing radiation and air pollution absorbing materials ~60-80% zeolite and correspondingly 40-20% boehmite (retention aid) binder in de-ionized water (5:1 ratio) at pH 8-9, specifically 8.5-8.9 at 28-30 *C, specifically 28.8 *C, and an organic polymer containing Hydroxypropylcellulose (HPC)+Ethoxylated Methyl Glucoside (EMG) (Methyl Gluceth-20) 60%:40% (ratio) (sealant) (to minimize particle separation from the substrate creating dust), for two (2) minutes, then, b) the step of applying (spraying or dipping) or coating the absorbing material onto a woven or nonwoven (spunbond/meltblown polypropylene) fabric permanently sealing said material. This HEPA tested (0.3 microns) air filtration media maybe coated with a Mayer rod. The bottom (first layer) dry aim thickness is 1.8 mil and the top (or sealant) layer is 1.4 mil, air penetration is 0.001-0.003.

2. The use of a moisture laden polymer sealant according to 1 composed of HPC+EMG+H20 to produce an aqueous environment for cation exchange to occur.

3. Absorbent materials according to 1, such as zeolite adsorbent materials includes but are not limited to zeolite type X, zeolite type A, zeolite type Y, ZSM-3, chabazite, Naptolite, mordenite, Heu, brewsterite and boehmite and mixtures of these can also be used.

4. The nasal mask and disposable particulate filtration media according to 1, wherein said zeolite coating filter material has netted construction, and 5. The nasal mask and disposable particulate filtration media according to 1, wherein said filter material is a woven or non-woven fabric containing microcapsules allowing controlled release of medication for health and therapeutic effects.

What is claimed is:

1. A method for producing HEPA mechanical air filtration media, nasal mask and disposable particulate respirator filtration media comprising i) zeolites which act as a radiation, radioactive isotope and air pollution trapping agents, ii) retention aid and iii) a sealant polymer, the method comprising the steps of:
    a) mixing the zeolites at a ratio of 60-80% with 40-20% of boehmite as the retention aid in deionized water with a ratio of water to solids of 5:1, the water has a pH of 8-9 and a temperature of 28-30 degrees C., the sealant polymer is added to the mixture in which the sealant polymer consists of a 60:40 hydroxypropylcellulose (HPC) to ethoxylated methyl glucoside (EMG), for two minutes;
    b) applying the aqueous mixture from step a) onto a woven or nonwoven polypropylene fabric to form a bottom layer of 1.8 mil thickness;
    c) applying the aqueous mixture from step a) on the coated polypropylene fabric to form a top layer of 1.4 mil thickness which permanently seals the fabric.

2. The method of producing HEPA mechanical air filtration media, nasal mask and disposable particulate respirator filtration media according to claim 1 in which the zeolites are selected from the group consisting of: clinoptilolite, phillipsite, zeolite type X, zeolite type A, zeolite type Y, ZSM-3, chabazite, naptolite, mordenite, heu, brewsterite and mixture of these.

3. The method of producing HEPA mechanical air filtration media, nasal mask and disposable particulate respirator filtration media according to claim 1 wherein the fabric has netted construction.

4. The method of producing HEPA mechanical air filtration media, nasal mask and disposable particulate respirator filtration media wherein the fabric comprises microcapsules which allow controlled release of medication for health and therapeutic effects.

* * * * *